US011920036B2

(12) United States Patent
Liao et al.

(10) Patent No.: US 11,920,036 B2
(45) Date of Patent: Mar. 5, 2024

(54) RUBBER RESIN MATERIAL WITH HIGH DIELECTRIC CONSTANT

(71) Applicant: NAN YA PLASTICS CORPORATION, Taipei (TW)

(72) Inventors: Te-Chao Liao, Taipei (TW); Hung-Yi Chang, Taipei (TW); Chien-Kai Wei, Taipei (TW); Chia-Lin Liu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/740,278

(22) Filed: May 9, 2022

(65) Prior Publication Data

US 2023/0047133 A1    Feb. 16, 2023

(30) Foreign Application Priority Data

Aug. 2, 2021    (TW) ................. 110128304

(51) Int. Cl.
| | | |
|---|---|---|
| *C08L 9/06* | (2006.01) | |
| *B32B 15/06* | (2006.01) | |
| *B32B 25/02* | (2006.01) | |

(52) U.S. Cl.
CPC ............ *C08L 9/06* (2013.01); *B32B 15/06* (2013.01); *B32B 25/02* (2013.01); *B32B 2307/204* (2013.01)

(58) Field of Classification Search
None
See application file for complete search history.

(56) References Cited

U.S. PATENT DOCUMENTS

| | | | | |
|---|---|---|---|---|
| 9,332,637 B2 * | 5/2016 | Das | .................. | H05K 1/0346 |
| 10,546,665 B2 * | 1/2020 | Shimomai | ................ | H01B 3/30 |
| 2005/0109990 A1 * | 5/2005 | Yeager | ................ | H01M 8/0221 |
| | | | | 252/500 |
| 2015/0126684 A1 | 5/2015 | Das et al. | | |
| 2015/0380125 A1 | 12/2015 | Shimomai et al. | | |
| 2016/0237278 A1 | 8/2016 | Yang et al. | | |
| 2020/0247970 A1 | 8/2020 | Chen et al. | | |
| 2021/0032462 A1 | 2/2021 | Hwang et al. | | |

FOREIGN PATENT DOCUMENTS

| | | | | | |
|---|---|---|---|---|---|
| CN | 106380715 A | * | 2/2017 | ............ | B32B 37/10 |
| CN | 108329676 A | | 7/2018 | | |
| CN | 108473758 A | | 8/2018 | | |
| CN | 109852031 A | | 6/2019 | | |
| CN | 111378242 A | | 7/2020 | | |
| CN | 111801376 A | | 10/2020 | | |
| CN | 112500667 A | | 3/2021 | | |
| EP | 3546509 B1 | * | 4/2021 | ............ | C08J 3/203 |
| JP | 1245053 A | | 9/1989 | | |
| JP | 3162407 A | | 7/1991 | | |
| JP | 2762139 B2 | * | 6/1998 | ............ | C08F 287/00 |
| JP | 2008133414 A | | 6/2008 | | |
| JP | 2020125440 A | | 8/2020 | | |
| TW | 201827509 A | | 8/2018 | | |
| TW | 202118829 A | | 5/2021 | | |
| WO | WO-2016052521 A2 | * | 4/2016 | ............ | B29C 39/12 |

* cited by examiner

*Primary Examiner* — Tamra L. Dicus
(74) *Attorney, Agent, or Firm* — Li & Cai Intellectual Property Office

(57) ABSTRACT

A rubber resin material with high dielectric constant and a metal substrate with high dielectric constant are provided. The rubber resin material with high dielectric constant includes a rubber resin composition with high dielectric constant and inorganic fillers. The rubber resin composition with high dielectric constant includes: 40 wt % to 70 wt % of a liquid rubber, 10 wt % to 30 wt % of a polyphenylene ether resin, and 20 wt % to 40 wt % of a crosslinker. A molecular weight of the liquid rubber ranges from 800 g/mol to 6000 g/mol. A dielectric constant of the rubber resin material with high dielectric constant is higher than or equal to 2.0.

9 Claims, No Drawings

RUBBER RESIN MATERIAL WITH HIGH DIELECTRIC CONSTANT

CROSS-REFERENCE TO RELATED PATENT APPLICATION

This application claims the benefit of priority to Taiwan Patent Application No. 110128304, filed on Aug. 2, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a rubber resin material and a metal substrate, and more particularly to a rubber resin material with high dielectric constant and a metal substrate with high dielectric constant.

BACKGROUND OF THE DISCLOSURE

With the development of fifth generation wireless system (5G wireless system), high frequency transmission has undoubtedly become the main development trend in an attempt to meet requirements for the 5G wireless system. Accordingly, relevant industries have strived to develop a high frequency substrate material for high frequency transmission (e.g., a frequency ranging from 6 GHz to 77 GHz), such that a high frequency substrate can be applied to a base station antenna, a satellite radar, an automotive radar, a wireless communication antenna, or a power amplifier.

The high frequency substrate usually has a low dielectric dissipation factor (Df), so as to be used for high frequency transmission. A dielectric constant and the dielectric dissipation factor are collectively referred to as dielectric properties of the high frequency substrate in the disclosure.

A rubber resin material with high dielectric constant that is currently available on the market usually contains a certain amount of a liquid rubber. The liquid rubber has a high solubility and has a reactive functional group, so that the rubber resin material with high dielectric constant can be used as the high frequency substrate material. However, the liquid rubber cannot be added with no limit When an amount of the liquid rubber is higher than 25 wt %, a glass transition temperature (Tg) of the rubber resin material with high dielectric constant can become lower, and a peeling strength of a metal substrate made from rubber resin material with high dielectric constant can become weaker.

Therefore, a resin material with high dielectric constant and a metal substrate with high dielectric constant that can be applied in the field of high frequency transmission due to having good dielectric properties and a strong peeling strength have yet to be provided in the relevant industry.

SUMMARY OF THE DISCLOSURE

In response to the above-referenced technical inadequacies, the present disclosure provides a rubber resin material with high dielectric constant and a metal substrate with high dielectric constant.

In one aspect, the present disclosure provides a rubber resin material with high dielectric constant. The rubber resin material with high dielectric constant includes a rubber resin composition with high dielectric constant and inorganic fillers. The rubber resin composition with high dielectric constant includes: 40 wt % to 70 wt % of a liquid rubber, 10 wt % to 30 wt % of a polyphenylene ether resin, and 20 wt % to 40 wt % of a crosslinker. A molecular weight of the liquid rubber ranges from 800 g/mol to 6000 g/mol. A dielectric constant of the rubber resin material with high dielectric constant is higher than or equal to 2.0.

In certain embodiments, monomers forming the liquid rubber include a styrene monomer and a butadiene monomer, and based on a total amount of the liquid rubber being 100 mol %, an amount of the styrene monomer ranges from 10 mol % to 50 mol %.

In certain embodiments, based on a total amount of the butadiene monomer being 100 mol %, 30 mol % to 90 mol % of the butadiene monomer has a side chain containing an ethylene group after polymerization.

In certain embodiments, the inorganic fillers undergo a surface modification process to have at least one of an acryl group and an ethylene group.

In certain embodiments, the inorganic fillers include at least one of silicon dioxide, strontium titanate, calcium titanate, titanium dioxide, and alumina.

In certain embodiments, based on a total weight of the rubber resin composition with high dielectric constant being 100 parts per hundred resin (phr), an amount of the inorganic fillers ranges from 20 phr to 250 phr.

In certain embodiments, based on a total weight of the rubber resin composition with high dielectric constant being 100 phr, the inorganic fillers include 100 phr to 190 phr of silicon dioxide, strontium titanate, calcium titanate, or a combination thereof, 10 phr to 30 phr of alumina, and 20 phr to 60 phr of silicon dioxide.

In certain embodiments, the rubber resin material with high dielectric constant further includes a siloxane coupling agent. The siloxane coupling agent has at least one of an acrylic group and an ethylene group.

In certain embodiments, based on a total weight of the rubber resin composition with high dielectric constant being 100 phr, an amount of the siloxane coupling agent ranges from 0.1 phr to 5 phr.

In another aspect, the present disclosure provides a metal substrate with high dielectric constant. The metal substrate with high dielectric constant includes a substrate layer and a metal layer disposed on the substrate layer. The substrate layer is formed from a rubber resin material with high dielectric constant. The rubber resin material with high dielectric constant includes a rubber resin composition with high dielectric constant and inorganic fillers. The rubber resin composition with high dielectric constant includes: 40 wt % to 70 wt % of a liquid rubber, 10 wt % to 30 wt % of a polyphenylene ether resin, and 20 wt % to 40 wt % of a crosslinker. A molecular weight of the liquid rubber ranges from 800 g/mol to 6000 g/mol. A dielectric constant of the rubber resin material with high dielectric constant is higher than or equal to 2.0.

In certain embodiments, the metal substrate with high dielectric constant has a dielectric constant higher than or equal to 5.0.

In certain embodiments, a peeling strength of the metal substrate with high dielectric constant ranges from 4.5 lb/in to 7.0 lb/in.

Therefore, in the rubber resin material with high dielectric constant and the metal substrate with high dielectric constant provided by the present disclosure, by virtue of "the rubber resin composition with high dielectric constant including 40 wt % to 70 wt % of a liquid rubber" and "the rubber resin material with high dielectric constant including the inorganic fillers," the dielectric properties, the peeling strength, and the thermal resistance of the rubber resin material with high dielectric constant and the metal substrate with high dielectric constant can be enhanced.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Rubber Resin Material with High Dielectric Constant

A rubber resin material with high dielectric constant (or a rubber resin material for short) of the present disclosure contains a liquid rubber. By controlling properties of the liquid rubber, an amount of the liquid rubber added in the rubber resin material can be higher than an upper limit of the amount of the liquid rubber allowable in the conventional technology. Therefore, the rubber resin material of the present disclosure is more suitable to be used as a high frequency substrate material.

Specifically, the rubber resin material of the present disclosure includes a rubber resin composition with high dielectric constant (or a rubber resin composition for short) and inorganic fillers. The inorganic fillers are uniformly dispersed in the rubber resin composition. Specific properties of the rubber resin composition and the inorganic fillers will be illustrated below.

Rubber Resin Composition with High Dielectric Constant

The rubber resin composition of the present disclosure includes: 40 wt % to 70 wt % of the liquid rubber, 10 wt % to 30 wt % of a polyphenylene ether resin, and 20 wt % to 40 wt % of a crosslinker.

Through the aforesaid components and contents, the rubber resin composition of the present disclosure can be used to manufacture a metal substrate with high dielectric constant (or a metal substrate for short) that has a good thermal conductivity, good dielectric properties and a good thermal resistance. In addition, the metal substrate can have a strong adhesive force with a metal layer (i.e., having an appropriate peeling strength). Property tests for the metal substrate will be illustrated below.

When the liquid rubber has a molecular weight ranging from 800 g/mol to 6000 g/mol, flowability of the rubber resin composition can be enhanced. Accordingly, a glue filling property of the rubber resin composition can also be enhanced. Preferably, the molecular weight of the liquid rubber ranges from 1000 g/mol to 5500 g/mol. More preferably, the molecular weight of the liquid rubber ranges from 3000 g/mol to 5000 g/mol. The liquid rubber has a high solubility, such that the liquid rubber can enhance compatibility among components. In addition, the liquid rubber has a reactive functional group, such that a crosslink density of the rubber resin material after solidification can be enhanced.

It is worth mentioning that in the present disclosure, the amount of the liquid rubber in the rubber resin composition can be significantly increased by controlling the molecular weight of the liquid rubber and by controlling components and structures of monomers in the liquid rubber. Specifically, based on a total weight of the rubber resin composition being 100 wt %, the amount of the liquid rubber is higher than 25 wt %. In an exemplary embodiment, the rubber resin composition contains 40 wt % to 60 wt % of the liquid rubber.

In some embodiments, based on a total weight of the rubber resin composition being 100 wt %, the amount of the liquid rubber can be 40 wt %, 45 wt %, 50 wt %, 55 wt %, 60 wt %, 65 wt %, or 70 wt %.

In some embodiments, the liquid rubber includes a liquid diene rubber. The liquid diene rubber contains a high ratio of an ethylene group side chain (preferably, 1,2-ethylene group side chain). The crosslink density and the thermal resistance of the rubber resin material after solidification can be enhanced due to the ethylene group side chain of the liquid rubber. Specifically, the liquid diene rubber includes a polybutadiene resin. The polybutadiene resin is a polymer polymerized from butadiene monomers, such as a butadiene homopolymer or a copolymer formed from butadiene and other monomers. In other words, the liquid rubber can be a butadiene homopolymer or a butadiene copolymer, and preferably is the butadiene homopolymer.

In some exemplary embodiments, the liquid rubber is a copolymer formed from butadiene and styrene. In other words, monomers to form the liquid rubber include styrene and butadiene. A styrene monomer and a butadiene monomer can be randomly arranged to form a random copolymer or regularly arranged to form an alternating copolymer or a block copolymer.

Based on a total weight of the liquid rubber being 100 mol %, an amount of the styrene monomer ranges from 10 mol % to 50 mol %. When the liquid rubber contains 10 mol % to 50 mol % of the styrene monomer, a structure of the liquid rubber is likely to be similar to that of liquid crystal, such that the thermal resistance and the compatibility of the liquid rubber can be enhanced. Preferably, the liquid rubber contains 15 mol % to 50 mol % of the styrene monomer. When the amount of the liquid rubber is lower than 50 mol %, a viscosity of the rubber resin material will increase, which is not beneficial for manufacturing of the metal substrate.

Specifically, the butadiene monomer has two double bonds. Hence, different ways of polymerizing the butadiene monomer can result in different structures of the polybutadiene resin. In other words, the polybutadiene resin can include one or more structures of: cis-1,4-polybutadiene, trans-1,4-polybutadiene, and 1,2-polybutadiene. When the butadiene is polymerized through a 1,4-addition reaction, the structure of cis-1,4-polybutadiene or trans-1,4-polybutadiene can be formed. In the structure of cis-1,4-polybutadiene or trans-1,4-polybutadiene, neither cis-1,4-polybutadiene nor trans-1,4-polybutadiene has an unsaturated side chain. When the butadiene is polymerized through a 1,2-addition reaction, the structure of 1,2-polybutadiene can be formed. In the structure of 1,2-polybutadiene, 1,2-polybutadiene has an unsaturated side chain (such as an ethylene group).

In an exemplary embodiment, based on a total amount of the butadiene monomers being 100 mol %, 30 mol % to 90 mol % of the butadiene monomers (after polymerization) have a side chain containing an ethylene group. Preferably, based on the total amount of the butadiene monomers being 100 mol %, 30 mol % to 80 mol % of the butadiene monomers (after polymerization) have the side chain containing an ethylene group, or 30 mol % to 80 mol % of the butadiene monomers (after polymerization) have the ethylene group side chain.

When the liquid rubber has at least one unsaturated side chain containing an ethylene group (or an ethylene side chain), the crosslink density and the thermal resistance of the rubber resin composition after polymerization can be enhanced. In the present disclosure, an amount of the unsaturated side chain containing an ethylene group (or an ethylene side chain) in the liquid rubber can be quantified by an iodine value through a chemical analysis.

The higher the amount of the unsaturated side chain containing an ethylene group (or an ethylene side chain) is, the higher the iodine value of the liquid rubber is. Physical properties of the rubber resin composition after polymerization can be enhanced by the unsaturated side chain containing an ethylene group (or an ethylene side chain). The iodine value of the liquid rubber of the present disclosure ranges from 30 g/100 g to 60 g/100 g.

In order to measure the iodine value of the liquid rubber, 0.3 mg to 1 mg of the liquid rubber is completely dissolved in chloroform, and is placed in the dark for 30 minutes after a Wijs solution is added thereinto. Next, 20 ml of a potassium iodide solution (100 g/L) and 100 ml of water are added to form an analyte. Subsequently, the analyte is titrated by a sodium thiosulfate solution (0.1 mol/L) which is used as a titrant. When a color of the analyte becomes light yellow, a few drops of a starch solution are dripped into the analyte. Then, the analyte is further titrated until a blue color of the analyte disappears.

In the present disclosure, a molecular weight of the polyphenylene ether resin ranges from 1000 g/mol to 20000 g/mol. Preferably, the molecular weight of the polyphenylene ether resin ranges from 2000 g/mol to 10000 g/mol. More preferably, the molecular weight of the polyphenylene ether resin ranges from 2000 g/mol to 2200 g/mol. When the molecular weight of the polyphenylene ether resin is lower than 20000 g/mol, a solubility of the polyphenylene ether resin in a solvent can be increased, which is advantageous for preparing the rubber resin composition.

In some embodiments, based on the total weight of the rubber resin composition being 100 wt %, an amount of the polyphenylene ether resin can be 10 wt %, 15 wt %, 20 wt %, 25 wt %, or 30 wt %.

In an exemplary embodiment, the polyphenylene ether resin can have at least one modified group. The modified group can be selected from the group consisting of: a hydroxyl group, an amino group, an ethylene group, a styrene group, a methacryl group, and an epoxy group. The modified group of the polyphenylene ether resin can provide an unsaturated bond, so as to facilitate a crosslink reaction. In this way, a substrate material that has a high glass transition temperature and a good thermal resistance can be obtained. In practical application, two molecular ends of the polyphenylene ether resin each have the modified group, and the two modified groups are the same. In addition, the rubber resin composition can include one or more kinds of the polyphenylene ether resin.

In an exemplary embodiment, the polyphenylene ether resin can include one kind of polyphenylene ether or various kinds of polyphenylene ether.

For example, the polyethylene ether can be a polyphenylene ether that has two hydroxyl modified groups at molecular ends thereof, a polyphenylene ether that has two methacryl modified groups at molecular ends thereof, a polyphenylene ether that has two styrene modified groups at molecular ends thereof, or a polyphenylene ether that has two epoxy modified groups at molecular ends thereof However, the present disclosure is not limited thereto.

In an exemplary embodiment, the polyphenylene ether resin includes a first polyphenylene ether and a second polyphenylene ether. The first polyphenylene ether is different from the second polyphenylene ether. The first polyphenylene ether and the second polyphenylene ether can each be one of the polyphenylene ether that has two hydroxyl modified groups at the molecular ends thereof, the polyphenylene ether that has two methacryl modified groups at the molecular ends thereof, the polyphenylene ether that has two styrene modified groups at the molecular ends thereof, and the polyphenylene ether that has two epoxy modified groups at the molecular ends thereof However, the present disclosure is not limited thereto. A weight ratio of the first polyphenylene ether to the second polyphenylene ether ranges from 0.5 to 1.5. Preferably, the weight ratio of the first polyphenylene ether to the second polyphenylene ether ranges from 0.75 to 1.25. More preferably, the weight ratio of the first polyphenylene ether to the second polyphenylene ether is 1.

The crosslinker of the present disclosure can enhance a crosslinking degree of the polyphenylene ether resin and the liquid rubber. In the present embodiment, the crosslinker can include an allyl group. For example, the crosslinker can be triallyl cyanurate (TAC), triallyl isocyanurate (TRIC), diallyl phthalate, divinylbenzene, triallyl trimellitate, or any combination thereof Preferably, the crosslinker can be triallyl isocyanurate. However, the present disclosure is not limited thereto.

In some embodiments, based on the total weight of the rubber resin composition being 100 wt %, an amount of the crosslinker can be 20 wt %, 25 wt %, 30 wt %, 35 wt %, or 40 wt %.

Inorganic Fillers

An addition of the inorganic fillers can help decrease the viscosity and a dielectric constant of the rubber resin material. Certain kinds of the inorganic fillers can also enhance the thermal conductivity of the rubber resin material. The description above is for illustration purposes only, and the present disclosure is not limited thereto.

In the present disclosure, the inorganic fillers include silicon dioxide, strontium titanate, calcium titanate, titanium dioxide, alumina, or any combination thereof However, the present disclosure is not limited thereto. In an exemplary embodiment, the inorganic fillers include silicon dioxide, titanium dioxide, and alumina at the same time. In addition, the silicon dioxide can be replaced with strontium titanate, calcium titanate, or a combination thereof The silicon dioxide can be fused silica or crystalline silica. Preferably, the silicon dioxide is fused silica.

Based on the total weight of the rubber resin composition being 100 phr, an amount of the inorganic fillers can be 20 phr, 40 phr, 60 phr, 80 phr, 100 phr, 120 phr, 140 phr, 160 phr, 180 phr, 200 phr, 220 phr, 240 phr, or 250 phr.

In an exemplary embodiment, the inorganic fillers are processed by a surface modification process to have at least one of an acryl group and an ethylene group. Therefore, the inorganic fillers can react with the liquid rubber, so that the rubber resin composition can have a good compatibility, and the thermal resistance of the metal substrate is not negatively influenced. In addition, the amount of the inorganic fillers added in the rubber resin material can be higher than an upper limit of the amount of the inorganic fillers allowable in the conventional technology. Therefore, the rubber resin material of the present disclosure is more suitable to be used as the high frequency substrate material.

It should be noted that the inorganic fillers can include only one component or can include various components. In addition, the inorganic fillers can all undergo the surface modification process, or only a part of the inorganic fillers undergo the surface modification process, so as to have at least one of the acrylic group and the ethylene group. For example, in one configuration where the inorganic fillers include silicon dioxide and alumina, the silicon dioxide is surface modified to have at least one of the acrylic group and the ethylene group, but the alumina is not surface modified.

An appearance of the inorganic fillers can be spherical. An average particle size of the inorganic fillers ranges from 0.3 µm to 15 µm. The particle size of the inorganic fillers is within a range between 0.3 µm and 15 µm, such that the inorganic fillers can be uniformly dispersed in the rubber resin composition.

The amount of the inorganic fillers can be adjusted according to product requirements. In an exemplary embodiment, based on the total weight of the rubber resin composition being 100 phr, the amount of the inorganic fillers ranges from 20 phr to 250 phr. Preferably, based on the total weight of the rubber resin composition being 100 phr, the amount of the inorganic fillers ranges from 30 phr to 200 phr. More preferably, based on the total weight of the rubber resin composition being 100 phr, the amount of the inorganic fillers ranges from 40 phr to 160 phr. However, the present disclosure is not limited thereto.

In an exemplary embodiment, based on the total weight of the rubber resin composition being 100 phr, the inorganic fillers include 100 phr to 190 phr of silicon dioxide, strontium titanate, calcium titanate, or any combination thereof, 10 phr to 30 phr of alumina, and 20 phr to 60 phr of silicon dioxide.

Siloxane Coupling Agent

The rubber resin material can further include a siloxane coupling agent. Due to an addition of the siloxane coupling agent, reactivity and compatibility among a fiber cloth, the rubber resin composition, and the inorganic fillers can be enhanced, thereby increasing the peeling strength and the thermal resistance of the metal substrate.

In an exemplary embodiment, the siloxane coupling agent has at least one of an acrylic group and an ethylene group. A molecular weight of the siloxane coupling agent ranges from 100 g/mol to 500 g/mol. Preferably, the molecular weight of the siloxane coupling agent ranges from 110 g/mol to 250 g/mol. More preferably, the molecular weight of the siloxane coupling agent ranges from 120 g/mol to 200 g/mol.

In some embodiments, based on the total weight of the rubber resin composition being 100 phr, an amount of the siloxane coupling agent can be 0.1 phr, 0.5 phr, 1 phr, 1.5 phr, 2 phr, 2.5 phr, 3 phr, 3.5 phr, 4 phr, 4.5 phr, or 5 phr.

Flame Retardant

The rubber resin material can further include a flame retardant. An addition of the flame retardant can enhance flame retardancy of the metal substrate. For example, the flame retardant can be a phosphorus flame retardant or a bromine flame retardant. Preferably, the flame retardant is a halogen-free flame retardant (that is, without halogens).

The bromine flame retardant can be ethylene bistetrabromophthalimide, tetradecabromodiphenoxy benzene, decabromo diphenoxy oxide, or any combination thereof, but is not limited thereto.

The phosphorus flame retardant can be sulphosuccinic acid ester, phosphazene, ammonium polyphosphate, melamine polyphosphate, or melamine cyanurate. The sulphosuccinic acid ester can include triphenyl phosphate (TPP), tetraphenyl resorcinol bis(diphenylphosphate) (RDP), bisphenol A bis(diphenyl phosphate) (BPAPP), bisphenol A bis(dimethyl) phosphate (BBC), resorcinol diphosphate (e.g., CR-733S produced by DAIHACHI), or resorcinol-bis (di-2,6-dimethylphenyl phosphate) (e.g., PX-200 produced by DAIHACHI). However, the present disclosure is not limited thereto.

An amount of the flame retardant can be adjusted according to product requirements. In some embodiments, based on the total weight of the resin composition being 100 phr, the amount of the flame retardant ranges from 0.5 phr to 20 phr.

In some embodiments, based on the total weight of the resin composition being 100 phr, the amount of the flame retardant can be 0.5 phr, 2 phr, 4 phr, 6 phr, 8 phr, 10 phr, 12 phr, 14 phr, 16 phr, 18 phr, or 20 phr.

Property Test

In order to prove the rubber resin material of the present disclosure can be used as the high frequency substrate material, 40 wt % to 70 wt % of the liquid rubber, 10 wt % to 30 wt % of the polyphenylene ether resin, and 20 wt % to 40 wt % of the crosslinker are mixed to form the rubber resin composition. In addition, the inorganic fillers are further added into the rubber resin composition, so as to form the rubber resin material of Examples 1 to 6 and Comparative Examples 1 to 3. Specific contents of the rubber resin material of Examples 1 to 6 and Comparative Examples 1 to 3 are listed in Table 1.

The liquid rubber can be selected from the model RICON® 100, RICON® 150, RICON® 181, RICON® 257, ACTIV® 50, ACTIV® 1000, B-1000, B-2000, B-3000, and TE-2000 produced by CRAY VALLEY, SYNTHOMER, or NIPPON SODA. The RICON® 100, RICON® 181, and RICON® 257 liquid rubbers are butadiene/styrene copolymers. The RICON® 150, ACTIV® 50, ACTIV® 1000, B-1000, B-2000, and B-3000 liquid rubbers are butadiene homopolymers. The TE-2000 liquid rubber is a butadiene homopolymer containing polyurethane In other words, the RICON® 100, RICON® 181, and RICON® 257 liquid rubbers contain butadiene monomers and styrene monomers. The RICON® 150, ACTIV® 50, ACTIV® 1000, B-1000, B-2000, and B-3000 liquid rubbers only contain butadiene monomers but not styrene monomers. The TE-2000 liquid rubber contains polyurethane and butadiene monomers. Specific properties of the RICON® 100, RICON® 150, RICON® 181, and RICON® 257 liquid rubbers are listed in Table 2.

In Table 1, the polyphenylene ether resin is a polyphenylene ether resin produced by Saudi Basic Industries Corporation (SABIC) as the model SA9000, and the SA9000 polyphenylene ether resin has methacryl groups at two molecular ends thereof The crosslinker is triallyl isocyanurate (TRIC).

In Table 1, the inorganic fillers are selected from the group consisting of: silicon dioxide, strontium titanate, calcium titanate, titanium dioxide, alumina, and any combination thereof.

In Table 1, the siloxane coupling agent is selected from siloxane coupling agents produced by Dow Corning as the models Z6030 and Z6300. The Z6030 siloxane coupling agent is a siloxane coupling agent that has acrylic groups at molecular ends thereof The Z6300 siloxane coupling agent is a siloxane coupling agent that has ethylene groups at molecular ends thereof In other words, the Z6030 and Z6300 siloxane coupling agents can enhance the compatibility among the fiber cloth, the rubber resin composition, and the inorganic fillers.

Subsequently, a glass fiber cloth produced by Nan Ya Plastics Corporation as the model 1078 is immersed into the rubber resin material in each of Examples 1 to 6 and Comparative Examples 1 to 3. After immersion, drying, and molding, a prepreg is obtained. After the prepreg is processed, a metal layer is disposed on the prepreg, so as to form the metal substrate of Examples 1 to 6 and Comparative Examples 1 to 3. Properties of the metal substrate of Examples 1 to 6 and Comparative Examples 1 to 3 are listed in Table 1.

In Table 1, the properties of the metal substrate are measured by methods below.
(1) Dielectric constant (10 GHz): detecting a dielectric constant of the metal substrate at 10 GHz by a dielectric analyzer (model: HP Agilent E5071C).
(2) Dielectric dissipation factor (10 GHz): detecting a dielectric dissipation factor of the metal substrate at 10 GHz by the dielectric analyzer (model: HP Agilent E5071C).
(3) Peeling strength: measuring the peeling strength of the metal substrate according to the IPC-TM-650-2.4.8 test method.
(4) Thermal resistance: heating the metal substrate in an autoclave at a temperature of 120° C. and a pressure of 2 atm for 120 minutes, and then putting said metal substrate into a soldering furnace of 288° C., so as to record the time needed for delamination. If the time needed for delamination is over 10 minutes, the term "OK" is shown in Table 1. If the time needed for delamination is shorter than 10 minutes, the term "NG" is shown in Table 1.

TABLE 1

| | | Unit: phr | Example | | | | | | Comparative Example | | |
|---|---|---|---|---|---|---|---|---|---|---|---|
| | | | 1 | 2 | 3 | 4 | 5 | 6 | 1 | 2 | 3 |
| Rubber resin composition | Liquid rubber | Butadiene/styrene copolymer A | 55 | 55 | 55 | 0 | 0 | 55 | 0 | 55 | 55 |
| | | Butadiene/styrene copolymer B | 0 | 0 | 0 | 55 | 0 | 0 | 0 | 0 | 0 |
| | | Butadiene/styrene copolymer C | 0 | 0 | 0 | 0 | 55 | 0 | 0 | 0 | 0 |
| | | Butadiene homopolymer | 0 | 0 | 0 | 0 | 0 | 0 | 55 | 0 | 0 |
| | | Polyphenylene ether resin | 25 | 25 | 25 | 25 | 25 | 25 | 25 | 25 | 25 |
| | | Crosslinker | 20 | 20 | 20 | 20 | 20 | 20 | 20 | 20 | 20 |
| Inorganic fillers | | Silicon dioxide | 30 | 30 | 30 | 30 | 30 | 30 | 30 | 10 | 30 |
| | | Alumina | 10 | 10 | 10 | 10 | 10 | 10 | 10 | 30 | 10 |
| | | Titanium dioxide | 150 | 0 | 0 | 190 | 150 | 150 | 150 | 50 | 150 |
| | | Stronium titanate | 0 | 150 | 0 | 0 | 0 | 0 | 0 | 0 | 0 |
| | | Calcium titanate | 0 | 0 | 150 | 0 | 0 | 0 | 0 | 0 | 0 |
| Siloxane coupling agent | | Siloxane coupling agent having acrylic groups at molecular ends thereof | 1 | 1 | 1 | 1 | 1 | 0 | 1 | 1 | 0 |
| | | Siloxane coupling agent having ethylene groups at molecular ends thereof | 0 | 0 | 0 | 0 | 0 | 1 | 0 | 0 | 0 |
| | | Siloxane coupling agent having amine groups at molecular ends thereof | 0 | 0 | 0 | 0 | 0 | 0 | 0 | 0 | 1 |
| Rubber resin material | | Dielectric constant (10 GHz) | 2.4 | 2.4 | 2.4 | 2.4 | 2.4 | 2.4 | 2.4 | 2.4 | 2.4 |
| Metal substrate | | Dielectric constant (10 GHz) | 5.8 | 5.9 | 6.0 | 7.2 | 5.8 | 5.8 | 5.8 | 3.8 | 5.8 |
| | | Dielectric dissipation factor (10 GHz) × $10^3$ | 2.9 | 2.8 | 2.8 | 2.8 | 2.7 | 2.8 | 2.8 | 2.6 | 2.8 |
| | | Peeling strength (lb/in) | 5.8 | 5.7 | 5.6 | 5.2 | 5.5 | 5.6 | 3.8 | 5.1 | 3.9 |
| | | Thermal resistance | OK | OK | OK | OK | OK | OK | NG | OK | NG |

TABLE 2

| Model | Liquid rubber | Molecular weight | Amount of styrene monomer | Amount of butadiene monomer having a side chain containing an ethylene group after polymerization |
|---|---|---|---|---|
| RICON ® 257 | Butadiene/styrene copolymer | 5300 g/mol | 35 mol % | 70 mol % |
| RICON ® 100 | Butadiene/styrene copolymer | 4500 g/mol | 20 mol % | 70 mol % |
| RICON ® 181 | Butadiene/styrene copolymer | 3200 g/mol | 28 mol1% | 30 mol % |
| RICON ® 150 | Butadiene homopolymer | 3900 g/mol | 0 mol % | 70 mol % |

According to the results in Table 1, by controlling contents of the liquid rubber, the polyphenylene ether resin, and the crosslinker, the metal substrate of Examples 1 to 6 can have good dielectric properties, a good peeling strength, and a good thermal resistance. Even when the rubber resin composition contains a high content (higher than 25 wt %) of the liquid rubber, the metal substrate of the present disclosure can still have a good peeling strength.

Specifically, in the present disclosure, the dielectric constant (10 GHz) of the rubber resin material is higher than or equal to 2.0. Preferably, the dielectric constant (10 GHz) of the rubber resin material ranges from 2.0 to 7.2. The dielectric constant (10 GHz) of the metal substrate is higher than or equal to 5.0. Preferably, the dielectric constant (10 GHz) of the metal substrate ranges from 5.0 to 7.2. More preferably, the dielectric constant (10 GHz) of the metal substrate ranges from 5.5 to 6.5. The dielectric dissipation factor of the metal substrate is lower than or equal to 0.0035. Preferably, the dielectric dissipation factor of the metal substrate is lower than or equal to 0.0032. More preferably, the dielectric dissipation factor of the metal substrate is lower than or equal to 0.0030. The peeling strength of the metal substrate ranges from 4.5 lb/in to 7.0 lb/in. Preferably, the peeling strength of the metal substrate ranges from 5.0 lb/in to 7.0 lb/in.

According to the result of Comparative Example 1, when the styrene monomer is absent from the rubber resin composition, the reactivity of the rubber resin composition is decreased, thereby negatively influencing the peeling strength of the metal substrate. In Comparative Example 1, the liquid rubber only contains the butadiene homopolymer but not the styrene monomer, so that the peeling strength and the thermal resistance of the metal substrate are low.

According to the result of Comparative Example 2, controlling a total amount of titanium dioxide, strontium titanate, and calcium titanate to range from 20 phr to 50 phr (based on the total weight of the rubber resin composition being 100 phr) can enhance the dielectric constant of the metal substrate. In Comparative Example 2, based on the total weight of the rubber resin composition being 100 phr, an amount of the silicon dioxide is only 10 phr (lower than 20 phr), so that the dielectric constant of the metal substrate cannot be enhanced.

According to the result of Comparative Example 3, when the siloxane coupling agent has at least one of the acrylic group and the ethylene group at molecular ends thereof, the reactivity and the compatibility among the fiber cloth, the rubber resin composition, and the inorganic fillers can be enhanced, thereby increasing the peeling strength and the thermal resistance of the metal substrate. In Comparative Example 3, the siloxane coupling agent has the amino group at the molecular ends thereof, so that the peeling strength and the thermal resistance of the metal substrate cannot be effectively enhanced.

Beneficial Effects of the Embodiments

In conclusion, in the rubber resin material with high dielectric constant and the metal substrate with high dielectric constant provided by the present disclosure, by virtue of "the rubber resin composition with high dielectric constant including 40 wt % to 70 wt % of a liquid rubber" and "the rubber resin material with high dielectric constant including the inorganic fillers," the dielectric properties, the peeling strength, and the thermal resistance of the rubber resin material with high dielectric constant and the metal substrate with high dielectric constant can be enhanced.

Further, by virtue of "monomers forming the liquid rubber including a styrene monomer and a butadiene monomer," the peeling strength of the metal substrate with high dielectric constant can be enhanced.

Further, by virtue of "based on a total weight of the rubber resin composition with high dielectric constant being 100 phr, the inorganic fillers including 20 phr to 60 phr of silicon dioxide," the dielectric constant of the metal substrate with high dielectric constant can be increased.

Further, by virtue of "the siloxane coupling agent having at least one of an acrylic group and an ethylene group," the peeling strength and the thermal resistance of the metal substrate with high dielectric constant can be enhanced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A rubber resin material with high dielectric constant, comprising:
   a rubber resin composition with high dielectric constant, and
   inorganic fillers,
      wherein the rubber resin composition with high dielectric constant includes:
         40 wt % to 70 wt % of a liquid rubber, wherein a molecular weight of the liquid rubber ranges from 800 g/mol to 6000 g/mol, and monomers forming the liquid rubber include a styrene monomer and a butadiene monomer;

10 wt % to 30 wt % of a polyphenylene ether resin; and 20 wt % to 40 wt % of a crosslinker;

wherein, based on a total weight of the rubber resin composition with high dielectric constant being 100 phr, the inorganic fillers consist of:

100 phr to 190 phr of at least one inorganic compound selected from the group consisting of titanium dioxide, strontium titanate, and calcium titanate, 10 phr to 30 phr of alumina, and 20 phr to 60 phr of silicon dioxide;

wherein a dielectric constant of the rubber resin material with high dielectric constant is higher than or equal to 2.0.

2. The rubber resin material with high dielectric constant according to claim 1, wherein, based on a total amount of the liquid rubber being 100 mol %, an amount of the styrene monomer ranges from 10 mol % to 50 mol %.

3. The rubber resin material with high dielectric constant according to claim 1, wherein, based on a total amount of the butadiene monomer being 100 mol %, 30 mol % to 90 mol % of the butadiene monomer has a side chain containing an ethylene group after polymerization.

4. The rubber resin material with high dielectric constant according to claim 1, wherein the inorganic fillers undergo a surface modification process to have at least one of an acryl group and an ethylene group.

5. The rubber resin material with high dielectric constant according to claim 1, further comprising a siloxane coupling agent, wherein the siloxane coupling agent has at least one of an acrylic group and an ethylene group.

6. The rubber resin material with high dielectric constant according to claim 5, wherein, based on a total weight of the rubber resin composition with high dielectric constant being 100 phr, an amount of the siloxane coupling agent ranges from 0.1 phr to 5 phr.

7. A metal substrate with high dielectric constant, comprising a substrate layer and a metal layer disposed on the substrate layer, wherein the substrate layer is formed from a rubber resin material with high dielectric constant, the rubber resin material with high dielectric constant includes a rubber resin composition with high dielectric constant and inorganic fillers, and the rubber resin composition with high dielectric constant includes:

40 wt % to 70 wt % of a liquid rubber, wherein a molecular weight of the liquid rubber ranges from 800 g/mol to 6000 g/mol, and monomers forming the liquid rubber include a styrene monomer and a butadiene monomer;

10 wt % to 30 wt % of a polyphenylene ether resin; and 20 wt % to 40 wt % of a crosslinker;

wherein, based on a total weight of the rubber resin composition with high dielectric constant being 100 phr, the inorganic fillers consist of:

100 phr to 190 phr inorganic compound selected from the group consisting of titanium dioxide, strontium titanate, and calcium titanate, 10 phr to 30 phr of alumina, and 20 phr to 60 phr of silicon dioxide;

wherein a dielectric constant of the rubber resin material with high dielectric constant is higher than or equal to 2.0.

8. The metal substrate with high dielectric constant according to claim 7, wherein the metal substrate with high dielectric constant has a dielectric constant higher than or equal to 5.0.

9. The metal substrate with high dielectric constant according to claim 7, wherein a peeling strength of the metal substrate with high dielectric constant ranges from 4.5 lb/in to 7.0 lb/in.

* * * * *